United States Patent Office 3,537,239
Patented Nov. 3, 1970

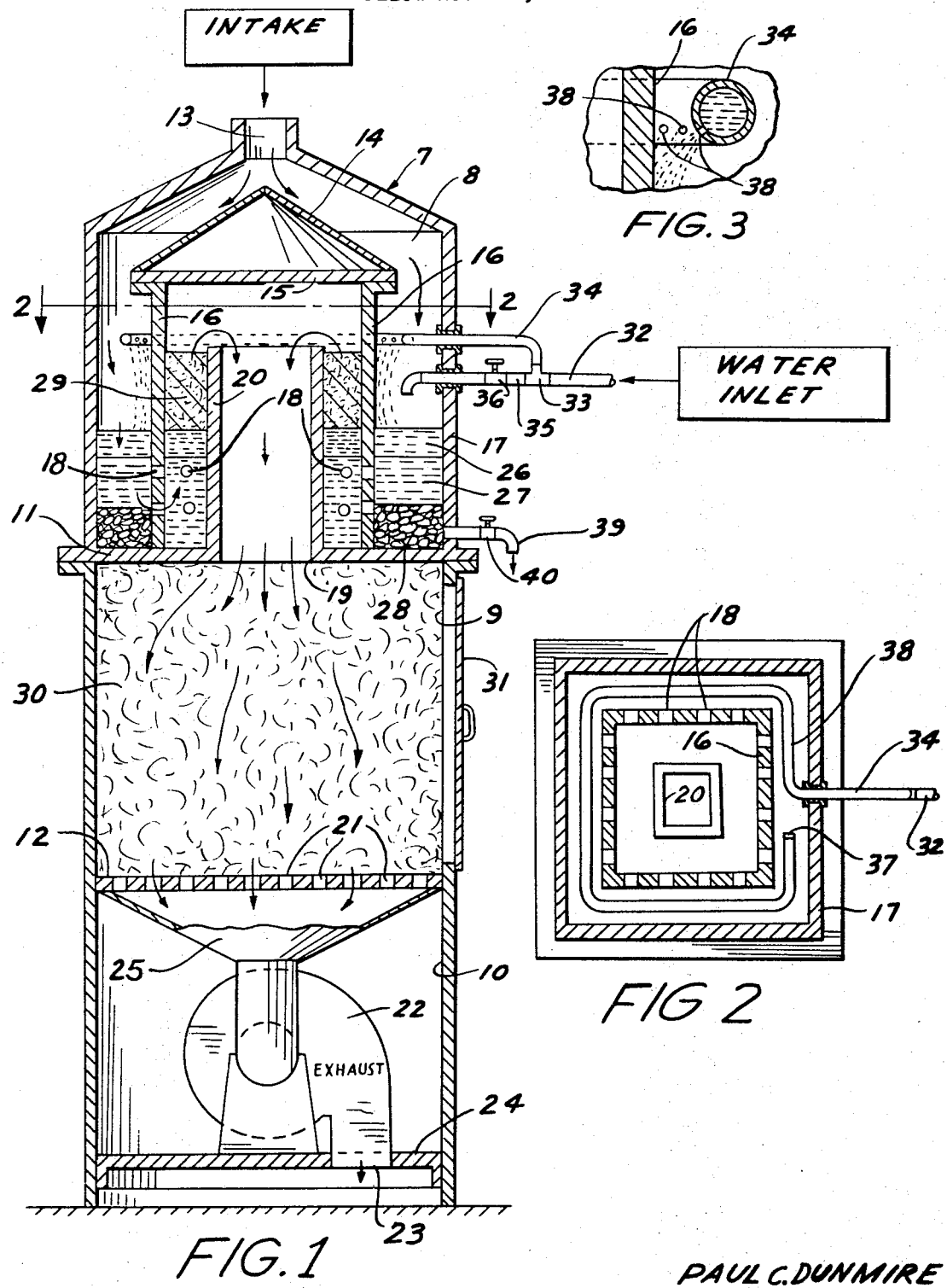

3,537,239
SMOKE ABATEMENT DEVICE
Paul C. Dunmire, 25448 River Rouge Drive,
Dearborn Heights, Mich. 48127
Filed Nov. 12, 1968, Ser. No. 774,820
Int. Cl. B01d 47/02
U.S. Cl. 55—242    4 Claims

ABSTRACT OF THE DISCLOSURE

An apparatus for removing pollutants from an air stream having an upper portion including concentric chambers defined by an outer closed housing having a feed inlet, an intermediate closed housing provided with perforations along its lower half, and an inner open ended conduit which connects the upper portion of the apparatus with its intermediate portion. Feed enters the outermost passing through layers of oil, water and lime which extend to a level above the perforations; the cleaned air then being drawn through the open ended conduit into the intermediate portion, which contains a filter bed and is connected to an exhaust. The apparatus further contains a perforated water intake pipe located in the outer passage for discharging a cooling liquid onto the upper portion of the perforated closed housing.

---

An object of the invention is to generally improve smoke abating devices.

A further object of the invention is to provide a device of the character indicated with means to cool the interior walls of the device, particularly near the intake end.

Another object of the invention is to provide means for flushing the device and disposing of contaminates trapped in the device.

Another object of the invention is to provide means for admitting water to the interior of the device, whereby to cool, flush and wash down certain of the interior walls of the device.

Another object of the invention is to provide means for introducing to the interior of the device a comparatively heavy flow of water.

Another object of the invention is to provide means for breaking up the stream of incoming smoke and gasses, and to disperse the same widely throughout the interior of the device, preliminary to the contaminate separation operation.

Another object of the invention is to provide means whereby certain of the filtering elements may be quickly removed and replaced in the device.

The foregoing and other objects and advantages of the invention will become more apparent as the description proceeds, reference being made from time to time to the accompanying drawing, forming part of the within disclosure, in which drawing:

FIG. 1 is a vertical section taken through a device embodying the invention.

FIG. 2 is a section taken substantially on the line 2—2 of FIG. 1.

FIG. 3 is an enlarged, fragmentary detail, in section, showing the water intake line, and the preferred position of the discharge openings in the water line, with respect to the interior of the device.

Referring now more particularly to the drawing, it will be understood that in the embodiment herein disclosed, the reference character 7 indicates a metallic receptacle, which is divided into substantially three compartments 8, 9 and 10. The compartment 8 is separated from compartment 9 by means of a plate 11, and the compartment 9 is separated from the compartment 10 by a perforated plate 12.

The compartment 8 has an intake 13 at the top, through which smoke, gasses and the like, containing contaminating materials are drawn into the device. The incoming flow of smoke and contaminates first strikes a conical member 14, which breaks up and evenly distributes the flow throughout the interior of the compartment 8, so that the filtering media hereinafter described may better function.

The conical member 14 is positioned on top of a plate 15, which is in turn positioned on top of a tubular member 16 to form a smaller housing, which is spaced from the outer walls 17 of the device. The walls of the member 16 are provided with spaced perforations 18 throughout the lower portion of the wall area below the oil layer. The tubular member 16 is supported on the plate member 11, and is secured thereto by any suitable means, such as welding.

The plate 11 has a central opening 19 around which is positioned a smaller imperforate tubular member 20, the upper end of which terminates in spaced relation, with the plate 15. The plate 12 is perforated as at 21, to permit the flow of the ultimately filtered air to pass through the plate 12 into the blower 22 and be exhausted from the device as at 23.

The blower 22 is mounted on a base member 24, and is provided with a frusto conical collector head 25.

The filtering and contaminate separating media consists of a layer of oil 26, a layer of water 27 and a layer of lime 28. The upper space between the tubular member 20 and the member 16 is preferably filled with horse hair 29, or other suitable filtering material and the lower part has the layers of oil and water as shown. The compartment 9 is preferably filled with fiberglass 30, which fiberglass may be installed in and removed from the compartment 9 through the door 31.

The incoming flow of smoke and gas enters the intake port 13, and strikes the frusto-conical member 14, which more or less evenly distributes the smoke and gas throughout the area 8 of the housing. The flow of smoke and gas at all times is under the influence of the exhaust blower 22. The incoming flow first strikes the oil layer 26 and then the water level 27, which is constantly being agitated by the lime 28. The oil layer removes and retains oily particles of the inflow. The water dissolves and retains water soluble or water miscible material, and the lime neutralizes acidic tars. After the inflow passes through these initial stages 26, 27, and 28, it is drawn through the apertures 18 in the member 16, and through the filtering material 29, and downwardly through the imperforate tubular member 20 into the compartment 9, where it is further filtered by the material 30 to remove any solids which remain therein. After passing through the filtering media 30, the flow is drawn through the apertures 21 through the exhaust blower, and is discharged to atmosphere as at 23.

In order to cool the incoming smoke and gasses, I provide a water intake 32, which has a T connection 33, which directs the water through the pipe 34, at all times and permits water to flow directly into the water compartments when the valve 36 is open. The pipe 35 terminates just inside the compartment 8 and serves to provide water for contaminate separation and for resupplying the layer of water in the device. The water line 34, as shown in FIG. 2, encircles the tubular member 16 in spaced relation thereto, and terminates in a capped end 37 (FIG. 2).

The water line 34 provided with a plurality of comparatively small apertures 38, which are angularly positioned, as shown in FIG. 3, to direct the flow of water against the outside wall of the member 16. This not only keeps the member 16 comparatively cool, but washes down and flushes the walls of the member 16 of any residual contaminates. By means of the valve 36 water may be discharged directly into the space between the walls 16 and 17 to replenish the water level in the device, and to further aid in flushing the contaminates from the device. I provide a water discharge member 39, with a valve 40, so that any contaminated water may be withdrawn from the device and be disposed of.

It is believed that the operation of the device is obvious from the foregoing description.

Having described my invention, what I claim and desire to secure by Letters Patent is:

1. A device comprising a main housing defining upper, lower and intermediate compartments with means to communicate said compartments with one another, said upper compartment having an intake opening at the top, said lower compartment having an exhaust blower therein and an exhaust opening, said intermediate compartment having a dry filtering medium therein, said upper compartment having positioned therein a smaller concentric housing closed at the top with walls spaced from the walls of said first named housing, the lower portion of the walls of said smaller housing being perforated, a smaller diameter, open ended, imperforate tubular member concentric with and within said smaller housing, the upper end of said tubular member extending to a level above said perforations in said smaller housing and the lower end of said tubular member communicating with said intermediate compartment, said upper compartment having filtering beds of oil, water, and lime therein to a depth greater than the perforated area of said smaller housing but lower than the upper end of said tubular member, and said smaller housing having a dry filter medium therein above said filtering beds, a water intake pipe extending through said main housing and surrounding the outer walls of said smaller housing, and having downwardly directed perforations for washing and cooling the outer walls of said smaller housing.

2. The structure of claim 1, including a frusto-conical member positioned on top of said smaller housing with its apex in spaced relation to the center of said intake opening.

3. The structure of claim 1, in which said upper compartment is provided with water drain means and a second water intake means.

4. The structure of claim 1, in which said intermediate compartment has a comparatively large, covered opening through which dry filtering material may be inserted and removed.

References Cited
UNITED STATES PATENTS

| | | | |
|---|---|---|---|
| 1,062,445 | 5/1913 | Ernst | 55—250 |
| 1,357,140 | 10/1920 | Bellville et al. | 55—252 |
| 2,862,354 | 12/1958 | Barnhart | 60—30 |
| 226,908 | 4/1880 | Edwards | 55—259 X |
| 1,012,089 | 12/1911 | MacKay | 55—316 X |
| 1,402,814 | 1/1922 | Wachtel | 60—30 |
| 2,083,649 | 6/1937 | Heglar | 55—323 |
| 2,430,861 | 11/1947 | Carpenter et al. | 55—316 |
| 2,677,601 | 5/1954 | Ruth | 23—2 |

FRANK W. LUTTER, Primary Examiner

V. H. GIFFORD, Assistant Examiner

U.S. Cl. X.R.

55—250, 258, 259, 260, 466, 472